No. 794,965. PATENTED JULY 18, 1905.
A. A. WOOD.
MACHINE FOR SEALING BOTTLES.
APPLICATION FILED APR. 1, 1904

WITNESSES
INVENTOR
Albert A. Wood,
BY
ATTORNEYS.

No. 794,965. PATENTED JULY 18, 1905.
A. A. WOOD.
MACHINE FOR SEALING BOTTLES.
APPLICATION FILED APR. 1, 1904.

WITNESSES
C. H. Bertholf
J. H. Hoffman

INVENTOR
Albert A. Wood
BY
Geo. W. T. Howard
ATTORNEYS.

No. 794,965. PATENTED JULY 18, 1905.
A. A. WOOD.
MACHINE FOR SEALING BOTTLES.
APPLICATION FILED APR. 1, 1904.

WITNESSES
C. H. Bertholf
J. W. Hoffman

INVENTOR
Albert A. Wood
BY
Geo. W. T. Howard,
ATTORNEYS.

No. 794,965. PATENTED JULY 18, 1905.
A. A. WOOD.
MACHINE FOR SEALING BOTTLES.
APPLICATION FILED APR. 1, 1904

WITNESSES
C. H. Bertholf
J. W. Hoffman

INVENTOR
Albert A. Wood
BY
G. H. & W. T. Howard
ATTORNEYS

No. 794,965. PATENTED JULY 18, 1905.
A. A. WOOD.
MACHINE FOR SEALING BOTTLES.
APPLICATION FILED APR. 1, 1904.

WITNESSES
INVENTOR
Albert A. Wood,
BY
ATTORNEYS

No. 794,965. PATENTED JULY 18, 1905.
A. A. WOOD.
MACHINE FOR SEALING BOTTLES.
APPLICATION FILED APR. 1, 1904.

WITNESSES
C. H. Bertholf
J. W. Hoffman

INVENTOR
Albert A. Wood,
BY
Geo. W. T. Howard
ATTORNEYS.

No. 794,965. PATENTED JULY 18, 1905.
A. A. WOOD.
MACHINE FOR SEALING BOTTLES.
APPLICATION FILED APR. 1, 1904

WITNESSES
C. H. Bertholf
J. W. Hoffman

INVENTOR
Albert A. Wood
BY
Geo. W. T. Howard
ATTORNEYS

No. 794,965.

Patented July 18, 1905.

UNITED STATES PATENT OFFICE.

ALBERT A. WOOD, OF ATLANTA, GEORGIA.

MACHINE FOR SEALING BOTTLES.

SPECIFICATION forming part of Letters Patent No. 794,965, dated July 18, 1905.

Application filed April 1, 1904. Serial No. 201,090.

*To all whom it may concern:*

Be it known that I, ALBERT A. WOOD, of the city of Atlanta, in the county of Fulton and State of Georgia, have invented certain Improvements in Machines for Sealing Bottles, of which the following is a specification.

This invention relates to an improved machine for securing to bottles sealing-caps of various forms which comprise as an element thereof a flange which in the sealing operation has to be uniformly reduced in diameter, as hereinafter described.

In the drawings forming a part hereof a sealing-cap of the general description referred to is shown; but it must be understood that the machine is not adapted solely to the manipulation of bottle-caps, but may be equally as well employed in various other mechanical operations wherein a reduction in diameter of a sheet-metal cylinder is to be effected by a condensation of the material of the cylinder rather than by an extension in length of the same, as is the result in an operation generally known as "spinning."

In the further description of the said invention which follows reference is made to the accompanying drawings, forming a part hereof, and in which—

Fig. 28 is a perspective view of a certain block illustrated in Figs. 1, 2, 26, and 27.

Referring now to the drawings, 1 is the fixed hollow columnar frame of the machine, terminating at its upper end in a table 2, upon which the bottles to be sealed are placed.

3 is the main driving-shaft, supported in suitable bearings formed in the wall of the columnar frame 1, having at one end the driving-pulley 4 and at the other end the spur-pinion 5.

7 is another shaft situated on a lower plane than the one 3, adapted to rotate in a bushed sleeve 9, (see particularly Fig. 8,) formed as a part of the columnar frame and having at one end the spur-gear 10, the teeth of which are in mesh with those of the pinion 5. In the outer face of this gear-wheel is a cam-slot 12, the conformation of which is well shown in Fig. 1.

Figure 1:
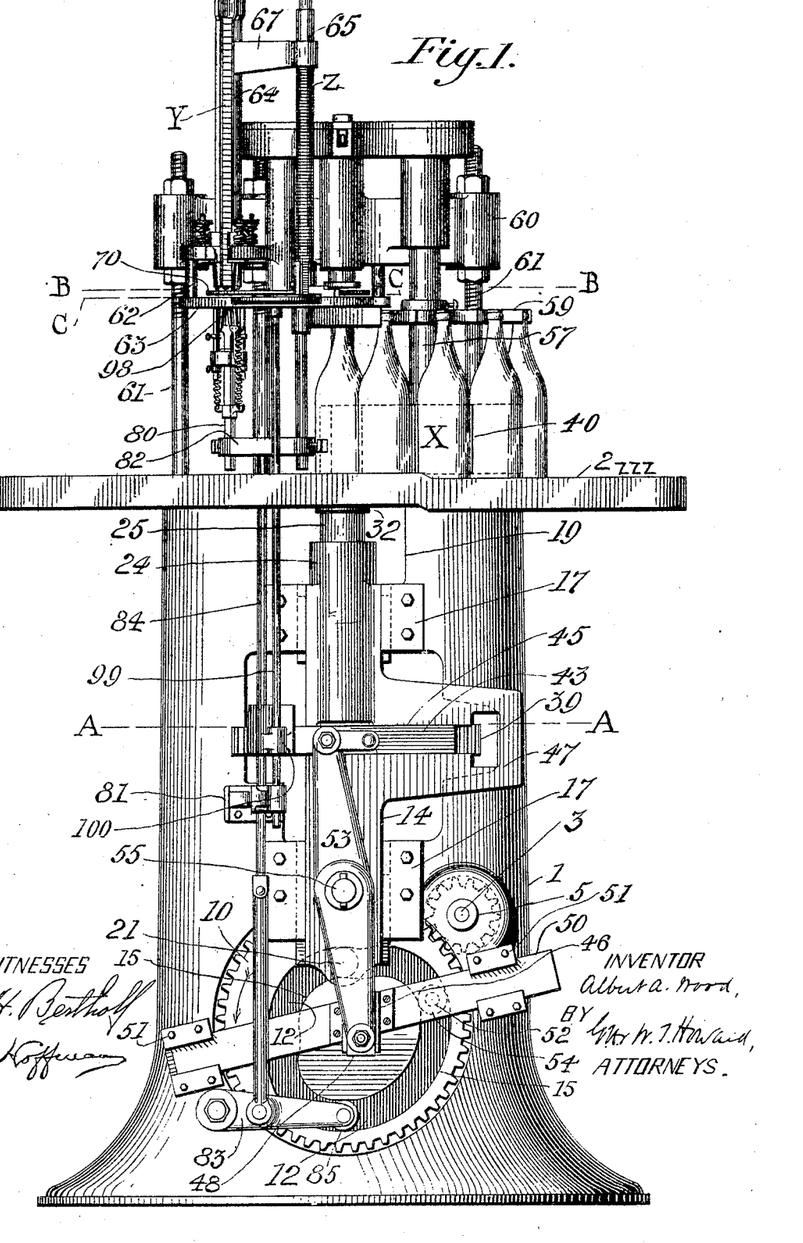
Figure 1 is an exterior front elevation of the improved machine.

A portion of the front wall of the columnar frame 1 is cut away, as shown in Fig. 1, to expose the outer face of the spur gear-wheel 10 and to admit of the operation of the cross-head 14, which has a vertical reciprocating movement, effected primarily by the horizontal faces 15 of the cam-slot 12, as hereinafter described.

The cross-head is guided in its vertical motion by the guides 17, affixed to the edges 19 of the frame 1, (see Fig. 1,) and it is driven by the roller 21, (shown in Figs. 1 and 8,) which rotates on a pin 22, extending backward from the lower end of the cross-head.

The upper end of the cross-head is bored to form a cylinder 24 (see Fig. 8) to receive a loose cylindrical sleeve 25, and to limit the upward movement of this sleeve independently of the cross-head its upper portion is turned to a smaller diameter to produce the annular shoulder 27. The cylindrical portion of the cross-head is provided with a ring 29, which fits the reduced part of the sleeve and is screwed into the cylinder. This arrangement admits of the vertical adjustment of the said sleeve to bring a cushioned bottle-seat 30, hereinafter more particularly referred to, into horizontal alinement with the upper face of the table 2 when in its lowest position.

32 is an annular cap screwed over the top of the sleeve 25, and its inner edge projects within the sleeve to form an annular head.

The cushioned bottle-seat before briefly referred to consists, preferably, of a disk of rubber which rests on the cap 32, having a cylindrical projection on its lower side which fits tightly in the cap, whereby the two parts have a common movement.

35 is a sleeve (see Figs. 8 and 9) bolted to the under side of the table 2, with its upper end projecting through a hole in the same, which sleeve constitutes a bearing for the vertical rotary shaft 37. At the lower end of this shaft is secured a pinion 39 and at its upper end a disk 40, (see particularly Figs. 8 and 9,) having in its circumference, say, ten pockets 42, corresponding in curvature with the bodies of the bottles to be sealed. A plan view of this pocketed disk is shown in dotted lines in Figs. 2 and 4.

Figure 3:
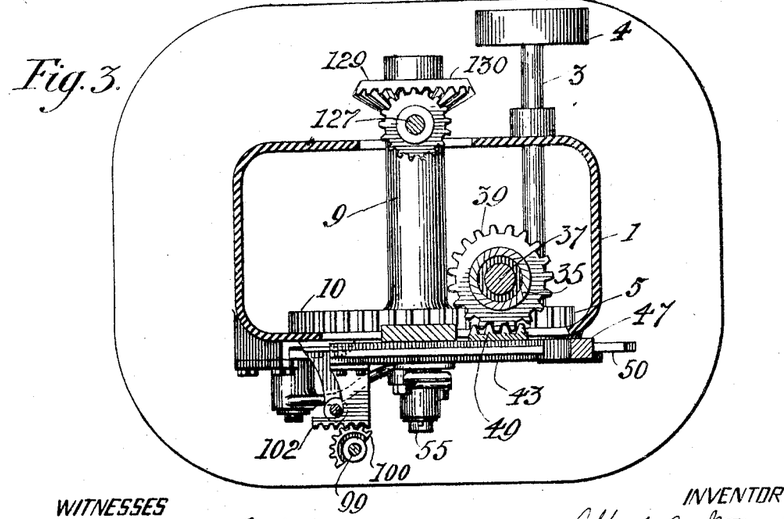
Fig. 3 is a section of Fig. 1, taken on the dotted line A A.

43 is a horizontal bar (see Figs. 1, 3, and 8) adapted to have a sliding movement in a slot 45, formed in a lateral projection 47 of the cross-head 14, (see Fig. 1,) and 49 a rack secured to the inner side of the bar 43, (see Fig. 3,) shown as provided with four teeth adapted to engage with those of the pinion 39.

50 is a bar, (see Fig. 1,) situated in an inclined position, arranged to slide in the bearings 51, secured to the front of the columnar frame 1.

53 is a rocker on a stud 55, extending from the outer face of the cross-head, (see Figs. 1 and 8,) with its upper arm linked to the horizontal sliding bar 45 and its lower arm pivoted to a block 48, adapted to slide between two flanged guide-plates 46, bolted to the face of the inclined sliding bar 50. The rear side of the bar 50 has a stud 52, (shown in dotted delineation in Fig. 1,) about which rotates a roller 54, (also shown in dotted lines,) which rests in the cam-slot 12 in the spur gear-wheel 10. In the rotation of the gear-wheel 10 the rack-bar 49 is reciprocated horizontally, and should its teeth be in mesh with those of the pinion 39 that device will be subjected to rotation in alternate directions; but it will be remembered that the cross-head is subjected to a vertical reciprocating motion, and it follows, therefore, that as the upward movement of the rack-bar is greater than the width of the faces of the rack and pinion, which are in alinement at the beginning of the vertical movement, the teeth of the two devices become disengaged. This peculiarity has been availed of to effect an intermittent partial rotation of the pocketed disk 40 in one direction only, or that direction whereby bottles are carried to a proper position under the sealing devices hereinafter described.

Figure 8:
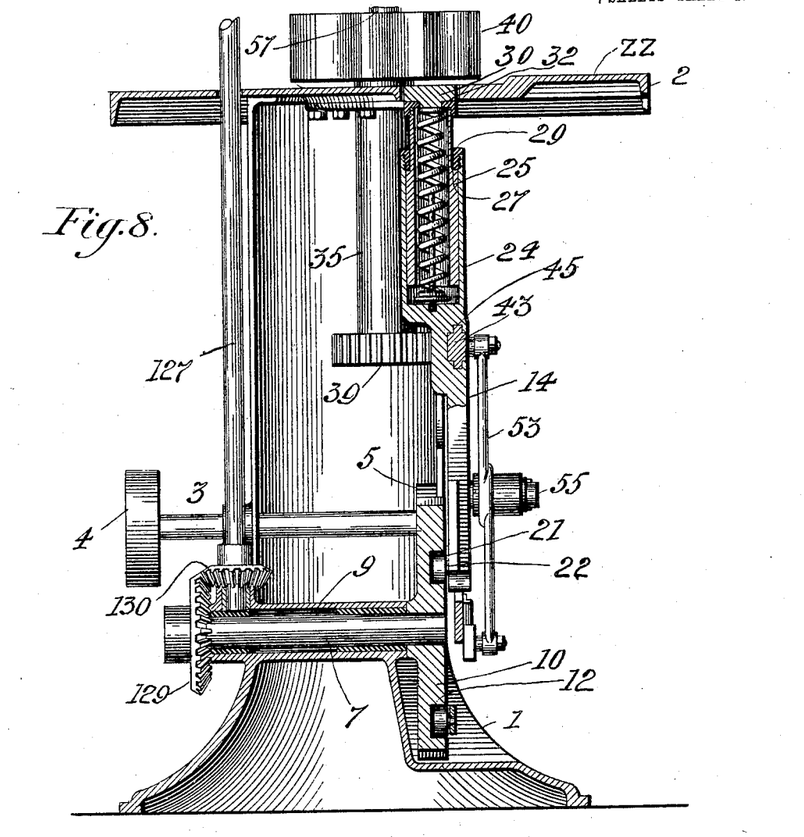
Fig. 8 is a section of Fig. 4, taken on the dotted line D D and looking in the direction indicated by the arrow.
Figure 9:
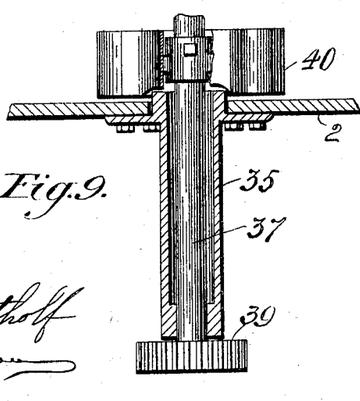
Fig. 9 is a partly-sectional view of a part of the table of the machine, together with an exterior view of a pocketed disk and certain of its attachments whereby unsealed bottles are carried to the sealing mechanism and after the sealing operation conducted to a portion of the table from which they are removed by hand.
Figures 19, 20, 21, 22, 23, 24, 25, 26, 27:
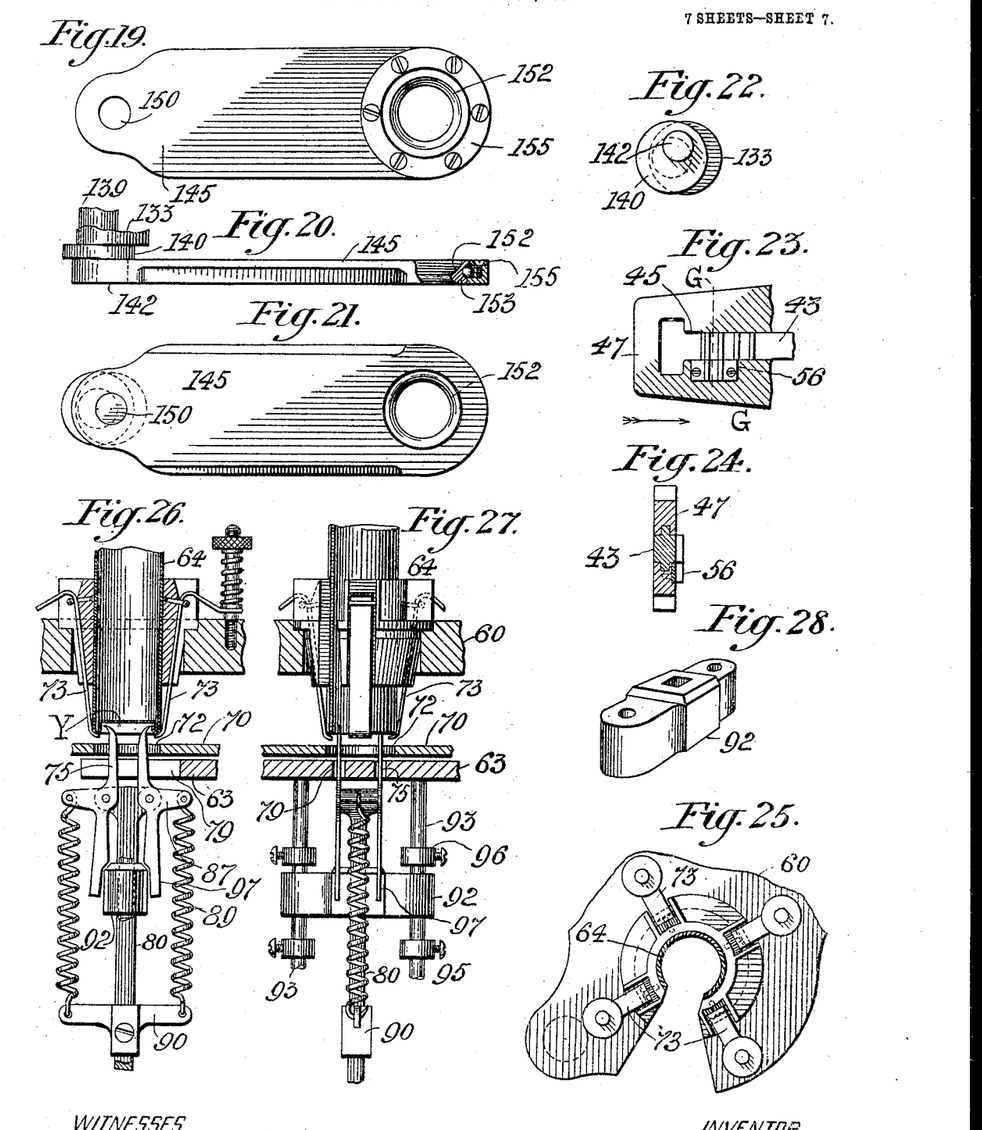
Figs. 19, 20, and 21 are respectively a top, a partly-sectional side or edge, and an under side view of a sliding vibratory lever carrying an indenting-ring whereby the material of the flange of the sealing-cap is condensed and made to fit closely against the bottle-head in the sealing operation.
Fig. 22 is a top view of a certain crank mechanism shown particularly in Figs. 20 and 21 whereby the vibratory movement of the sliding lever before referred to is effected.
Fig. 23 is a reverse view of a part of a certain cross-head, a front or face view of which is shown in Fig. 1.
Fig. 24 is a section of Fig. 23, taken on the dotted line G G looking in the direction indicated by the arrow.
Figs. 25, 26, and 27 are respectively an enlarged plan, a side, and an edge view of certain parts of the apparatus whereby sealing-caps are drawn from a magazine consisting of an open-face tube and brought to certain devices whereby they are carried one by one to the sealing mechanism.

By reference to Figs. 1 and 8, in which the bottle-seat is shown as in its lowest position—that is to say, with its upper surface fair or flush with that of the top of the table—it will be seen that as the spur gear-wheel 10 begins to rotate in the direction indicated by the curved arrow in Fig. 1 the cam-surfaces, in view of their peculiar configuration, cause the cross-head, with its bottle-seat, to rise, while there is no movement of the inclined bar 50, for the reason that the roller 54 is in a part of the cam-slot which is concentric with the shaft 7; but soon after the bottle-seat has reached its highest position and while it is held thereat during the sealing operation hereinafter described and after the teeth of the rack have been lifted out of engagement with those of the pinion 39 the roller 54 reaches a position in the cam-slot which by reason of its eccentricity with reference to the shaft 7 causes the rack to move to its extreme position to the right. After the completion of the return or downward movement of the bottle-seat and before the next upward motion of the same begins the roller 54 will have entered the section of the cam-slot whose eccentricity with respect to the shaft causes the rack-bar to move to the left and effect the rotation of the pinion 39, the teeth of which are then in engagement therewith, and a corresponding rotation of the pocketed disk, which carries another bottle to the proper position for sealing; but it is evident that with the mechanism just described the lifting of the rack-bar above the teeth of the pinion 39 would leave the bottle being sealed without any holding device to keep it in place. To remedy this, the lateral extension of the cross-head at a point immediately opposite the pinion 39 and below the slot 45 in the said extension is provided with, say, two or three teeth 56, as shown in Figs. 23 and 24, which mesh with those of the pinion 39 as the teeth of the rack leave them. This construction produces a complete and effective lock, whereby the pocketed disk is held immovable during the sealing operation.

It has been stated that the pockets in the disk 40 conform in curvature with the bodies of the bottles, and although the pockets are all at a common distance from the center of the disk this construction alone would not cause the heads of all the bottles to accurately traverse a common circular path. The disk is therefore provided with an upright central column 57, (see Figs. 1 and 8,) terminating in a pocketed disk 59 (shown in Figs. 1, 2, and 4) of such configuration as to fit the necks of the bottles when the same are in a vertical position. In Fig. 1 bottles marked X are shown supported in the manner described.

Figure 4:
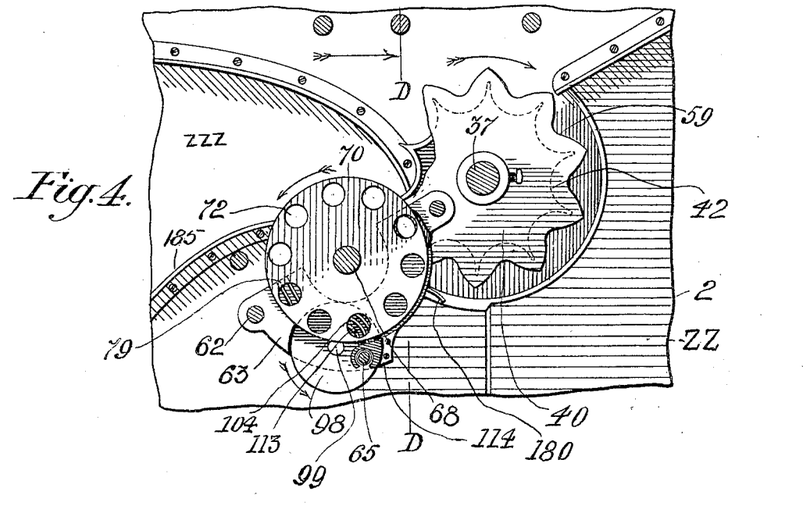
Fig. 4 is an enlarged section of Fig. 1, taken on the dotted line B B.
Figures 5, 6, 7:
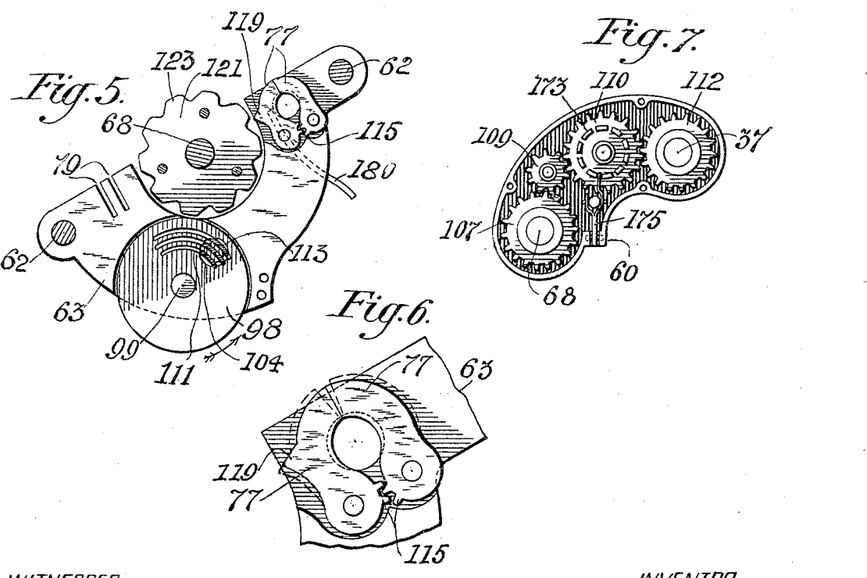
Fig. 5 is an enlarged section of a part of Fig. 1, taken on the dotted line C C.
Fig. 6 is an enlarged top view of certain yielding cap-shutters, together with a part of the plate to which they are pivoted.
Fig. 7 is a plan of a train of gears situated within the head of the machine, with the covering-plate removed.
Figures 10, 11, 12:
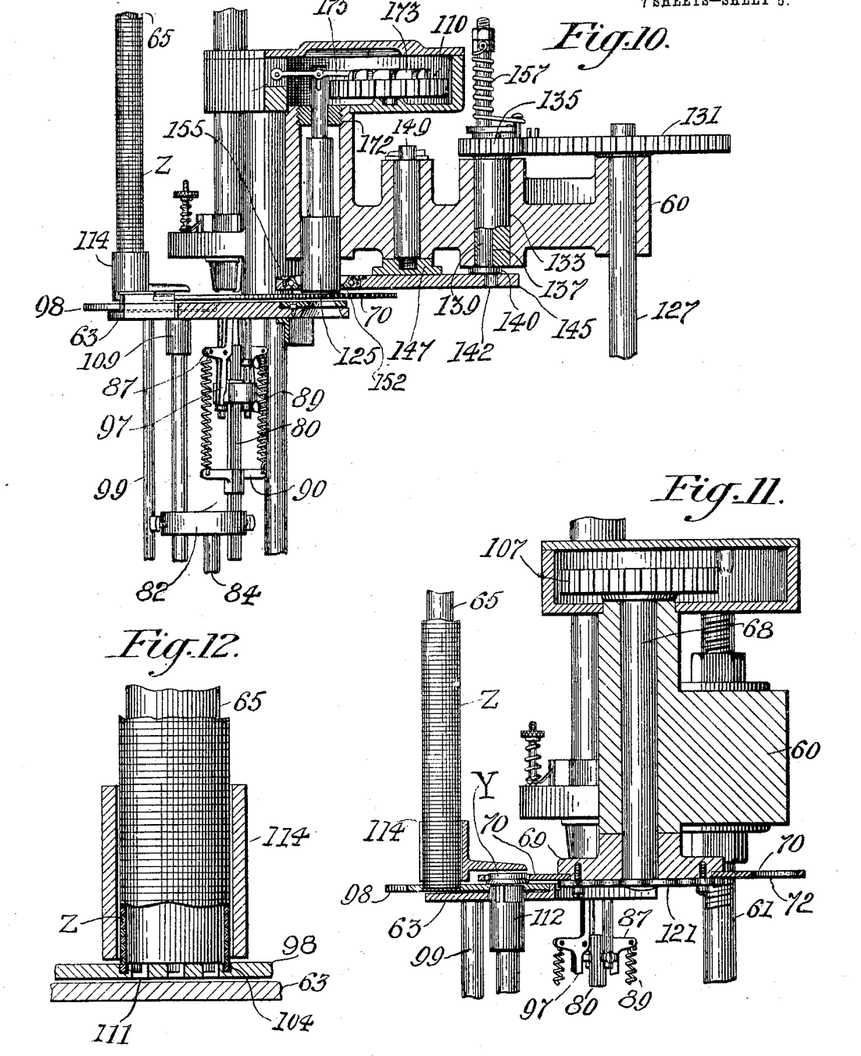
Fig. 10 is a section of Fig. 2, taken on the dotted line E E looking in the direction indicated by the arrow.
Fig. 11 is another section of Fig. 2, taken on the dotted line F F, still looking in the direction indicated by the arrow.
Fig. 12 is an enlarged view of a stem upon which are placed certain packing-rings used in sealing the bottles and certain attachments thereof, which are shown in section.
Figure 17:
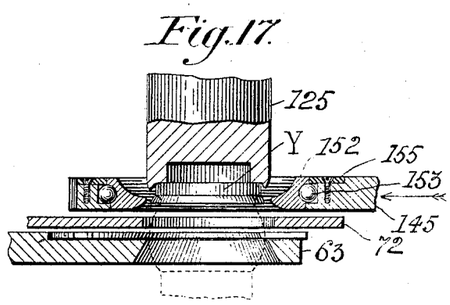
Fig. 17 is an enlarged vertical section of the cap-closing devices, together with a sealing-cap which is shown in the position which it occupies immediately before the beginning of the said operation.
Figure 18:
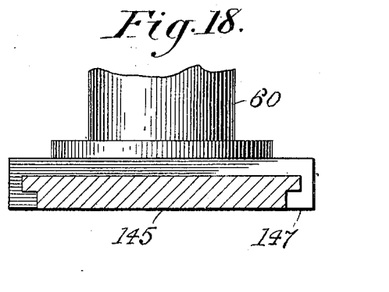
Fig. 18 is a cross-section of the lever shown in Fig. 17 or one looking in the direction indicated by the arrow, together with the rabbeted pivotal hub within which it slides.

60 is a head situated above and supported from the table 2 by means of the bolts 61, which are threaded and provided with nuts, whereby the head is adjustable in height. Situated a short distance below the head 60 and suspended from the same by means of the bolts 62 is a segmental plate 63, a top view of which is shown in Figs. 4 and 5, upon the upper surface of which are deposited the sealing-caps to be applied to the bottles. The sealing-caps, which are denoted in Fig. 1 by Y, are placed one upon another, flange down, within an open-faced vertical tube 64, supported in any appropriate manner from the head 60, with its lower end elevated some considerable distance above the upper surface of the segmental plate, as is well shown in Figs. 26 and 27, in the former of which a sealing-cap is shown. A sealing-cap is also shown in Figs. 11 and 17.

The packing-rings Z are placed in column loosely on a vertical stem 65, supported by a bracket 67 (shown in Fig. 1) from the open-faced cap-tube 64. The lower end of the stem 65 is in contact with the upper surface of a vibratory disk 98, hereinafter fully described, upon which it bears with the force of gravity. (See Figs. 4 and 12.)

68 is a vertical shaft (see particularly Fig. 11) journaled in the head 60, having at its lower end a hub 69, carrying an annular plate 70, (see Figs. 1, 4, 10, 11, 26, and 27,) having ten holes 72 therein equidistant apart and slightly larger in diameter than the sealing-caps, and the position of the said plate is such that each of the said holes in the intermittent rotation of the annular plate is brought successively under the cap-tube 64.

The lowest sealing-cap of the column is held within the tube 64 by the yielding springs 73 (see Figs. 26 and 27) and is withdrawn from the tube by the fingers 75, hereinafter more particularly described, into the hole 72 in the annular plate 70 beneath it. The said cap is carried around in the intermittent motions of the plate until it is finally deposited directly over a bottle, where it is temporarily held by certain yielding shutters 77, as hereinafter specified.

The cap-withdrawing fingers 75, before briefly referred to, have a vertical reciprocating movement through slots 79 in the segmental plate 63, (see Figs. 5, 26, and 27,) and their points, which are turned outward when in their highest position, are slightly below the crown of the lowest sealing-cap of the column within the tube 64. The said fingers are pivoted to the upper end of a vertical rod 80, extending downward to a cross-head 82 at the upper end of a vertical bar 84, which is steadied, as shown in Fig. 1, by a suitable bracket 81 near its end and linked to an arm 83, hinged to the columnar frame 1. This arm is vibrated by means of a roller 85 at its end, which rests in the cam-slot 12 in the spur gear-wheel 10. It will be understood that with this construction in the rotation of the said gear-wheel the vertical reciprocating movement of the fingers 75, before referred to, is produced.

To admit of the fingers 75 in their vertical reciprocating movement being alternately distended and contracted, so as to engage with the inner surface of the flange of a cap in the tube 64, pull down the cap, and then release the same, they are provided with the laterally-extending arms 87, which are united by springs 89 to a cross-head 90, fastened to the rod 80. These springs have the effect of normally retaining the fingers in an extended condition, and in order that they may be contracted so as to release the cap after it has passed into the hole 72 beneath it and has reached the segmental plate 63 there is placed on the rod 80 a loose block 92, adapted to slide independently of the said rod on the studs 93, which are fitted with the adjustable collars 95 and 96. The fingers are furnished with the tailpieces 97, the inner edges of which are at such a distance apart and of such configuration that upon the tailpieces riding over the block 92 when the same is seated on the lower collars 95 they will be distended and the points of the fingers withdrawn from contact with the inner surface of the flange of the cap. In the engagement of the said block and the tailpieces sufficient friction is produced between them to cause the block 92 to ascend with the rod 80, and this engagement is not broken until the block strikes the upper collars 96. From this explanation it will be understood that the collars can be so adjusted with respect to the tailpieces that the manipulation of the cap before referred to can be readily and positively effected.

By reference to the Figs. 4, 5, and 11 it will be seen that in the segmental plate 63 there is sunk flush with its surface the disk 98, before briefly referred to, which is fastened to the upper end of a vertical shaft 99, which extends downward and is journaled in the bracket 81, which furnishes the guide for the shaft 84.

The shaft 99, near its lower end, is provided with a toothed segment 100, (see Figs. 1 and 3,) the teeth of which are in mesh with a rack 102, fastened to the outer side of the horizontal bar 43, to which the rack 49 before described is attached. Consequently in the forward and backward motion of the said bar the disk 98 is oscillated, and the degree of oscillation is such that the annular recess 104 in the disk, which corresponds in size with the packing-rings Z, moves from under the column of packing-rings to a position beneath one of the holes 72 in the segmental plate 63, which has been provided with a sealing-cap, as hereinafter described.

The intermittent rotary movement of the shaft 68, carrying the annular plate 70, is in common with that of the shaft 37, carrying the pocketed disk 40, and is derived from the latter shaft through the train of gears 107, 109, 110, and 112, the ones 109 and 110 being idlers, as shown in Fig. 7, and at each movement of a bottle one hole 72 in the annular plate 70 is provided with a sealing-cap, and the annular recess 104 in the disk 98 vibrated a distance which carries it from under the vertical stem 65, from which it has received the lowest one of the column of packing-rings, to one of the holes 72, the ultimate effect of which will be hereinafter explained.

By reference to Figs. 4, 5, 10, 11, and 12 it will be seen that a portion of the vibratory disk 98 which includes the annular recess 104 is provided with a series of concentric segmental slots 111 and that underneath this grated surface is situated a vertically-reciprocating plunger 112, extending upward from the cross-head 82 and through the segmental plate 63. (See Fig. 11.) The upper end of the plunger 112 is provided with segmental bars 113, which rest in the segmental slots 111 in the vibratory disk 98 and which in their upward movement are projected through the part of the disk 98 which includes the grated annular recess 104, and should there at that time be a packing-ring in the said recess and a sealing-cap held over it, it follows that the said packing-ring will be forced into the cap and the cap adapted for application to a bottle. Now this is exactly what takes place in the operation of the machine, and to effect such result the various operations of the same are so timed that a sealing-cap is drawn down by the fingers 75 into one of the holes 72 in the then stationary annular plate 70, so as to rest on the vibratory disk 98 at the time that a packing-ring is lifted by the plunger 112 from another one of the recesses 104 in the said vibratory disk 98 into a sealing-cap.

To prevent the cap being lifted as it receives its packing-ring, the stationary segmental plate 63 is provided with the fixed lug 114, having a flange 116, which extends over the annular plate 70 and in such direction as to be immediately above the hole 72, holding the sealing-cap into which a packing-ring is being forced, as shown in Figs. 4, 10, 11, and 12. The part of this lug which overhangs the disk 98 is made hollow, as shown particularly in Figs. 11 and 12, to receive the lower end of the stem 65 and the packing-rings thereon and prevent the same being swayed in the rapid motion of the machine. The holes for the bolts or screws, whereby the lug 114 is held to the plate 63, are shown in Figs. 4 and 5.

The yielding shutters 77, before briefly referred to, are well shown in Figs. 5, 6, and 10, and it will be seen that they consist of pivoted plates situated in a recessed portion of the stationary segmental plate 63, so as to be flush with the general or top surface thereof. The inner edge of the extended or vibrating portion of these shutters is hollow or curved, (see Fig. 6,) and when the shutters are closed the width of the opening between them is somewhat less than the diameter of a sealing-cap, so that they constitute effective means for supporting a cap above a bottle to be sealed. In order that the shutters may open equally or without changing the position of the center of the opening between them, their hub portions are provided with teeth 115, the two sets meshing, as shown in Fig. 6. The shutters are opened by a bottle-head being thrust between them into the cap above, and to facilitate this operation their lower curved edges are rounded, which produces a flared opening, as shown in Fig. 10. As the shutters are not spring-held in a closed condition, mechanical means must be employed to close them after a bottle-head has been capped or sealed. The inner shutter is therefore furnished with an angular lateral projection 119, and the bottom of the hub 69 (see Fig. 11) with a disk 121, (see also Fig. 5,) having projections 123, which strike the projection 119 when the shutters are open and closes them. This action, it must be understood, takes place after the sealed bottle has been lowered from the sealing devices not yet described.

125 (see Figs. 10 and 17) is a vertical gravity-plunger adapted to slide in the head 60 directly over the cushioned bottle-seat 30. Its office at first is to prevent by its weight alone the lifting of the sealing-cap as the bottle-head is pushed into it and subsequently to limit the further elevation of the cap, and thereby effect the compression of the packing-ring during the seating operation hereinafter described.

127 is a vertical shaft journaled at its upper end in the head 60 (see Fig. 10) and at its lower end in a portion of the wall of the bearing 9 for the shaft 7. (See Fig. 8.) It is driven from the shaft 7 by means of the beveled gears 129 and 130, and to its upper end is secured the spur gear-wheel 131. (See Fig. 10.)

133 is a shaft (see Fig. 10) having at its upper end a tight spur-pinion 135 in mesh with the gear-wheel 131. The shaft 133 is bored eccentrically, as shown in Figs. 10, 13, 14, 15, and 16, and in the cylindrical hole 137 so produced is placed the shaft 139, having a crank-disk 140 and a crank-pin 142 at its lower end. The length of the crank formed by the pin 142 is equal to the eccentricity of the shaft 137 with respect to the shaft 133. Consequently the shaft 137 may be turned independently of the shaft 133 and the crank-pin 142 brought into axial alinement with the shaft 133. When such relative positions of the two shafts are maintained, their mutual rotation causes no motion of the crank-pin 142 other than its rotation about its axis, and it is an inoperative device as far as the production of useful motion is concerned; but should the shaft 137 be turned independently of the shaft 133 from the position described and the two shafts rotated together the pin 142 will then have a stroke which may be utilized in performing work.

145 is a lever (see Figs. 19, 20, and 21, which represent, respectively, a top, a partly-sectional edge, and an under side view of that device) having tongued edges. (Best shown in Fig. 20.) This lever is adapted to slide in a rabbeted slot in a hub 147, fastened to a vertical rotatable stud 149 in the head 60. (See Fig. 10.) The said lever at one end thereof has a hole 150, (see Fig. 19,) into which is inserted the crank-pin 142. The other end of the said lever is bored to receive the indenting-ring 152, which is held in place by the antifriction-balls 153 and the annular follower 155, as illustrated in Figs. 10, 17, and 20. The inner diameter of the indenting-ring is slightly greater than the flange of the sealing-cap, and its inner edge is practically V-shaped (see Figs. 17 and 20) or of such form that when the ring is pressed tightly against the outer surface of that portion of the flange of a sealing-cap seated on a bottle-head which projects below the shoulder on the bottle will indent the flange inward against the under side or surface of the same, and should the said ring while in indenting-contact with the flange be caused to gyrate the indentation produced as described will be continued or extended around the flange of the cap and the cap securely fastened to the bottle-head.

By reference to Figs. 10, 13, 14, 15, and 16 it will be seen that around the portion of the shaft 137 which projects above the spur-pinion 135 is coiled the torsion-spring 157, one end of which is attached to the said shaft and the other to the surface of the pinion, and the effect of the said spring is to yieldingly hold the crank-pin 142 in its eccentric position with respect to the shaft 133, and thereby through the instrumentality of the lever 145 cause the indenting-ring to gyrate and extend the indentation made by its first contact with the flange of the sealing-cap to extend around the same. To hold the crank-pin against the torsion-spring and in its inoperative or normal position, a toggle is employed, the same consisting of two bars 159 and 160, the former being fastened to the end of an arm 161, tight on the shaft 137, and the latter pivoted to the pinion 135. The toggle-bar 159 has a tailpiece 163, which when moved in the direction indicated by the dotted arrow in Fig. 13 breaks the toggle or changes the bars 159 and 160 from their alined position shown in Figs. 13, 14, and 16 to their bent position illustrated in Fig. 15, when the indenting-ring becomes an operative device.

Figure 13:
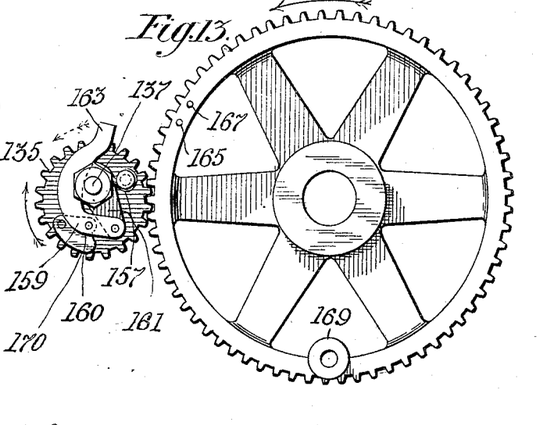
Figs. 13, 14, 15, and 16 are enlarged views of certain gears and their attachments shown in Fig. 2 which serve to close a sealing-cap on a bottle-head and illustrating the various relative positions of the parts under different circumstances, as hereinafter described.
Figure 14:
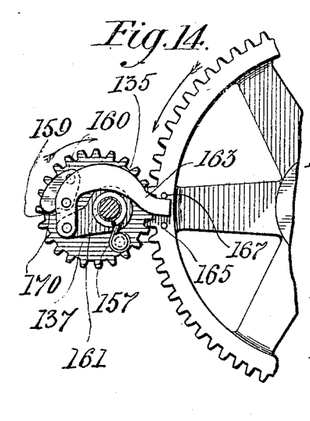
Figure 15:
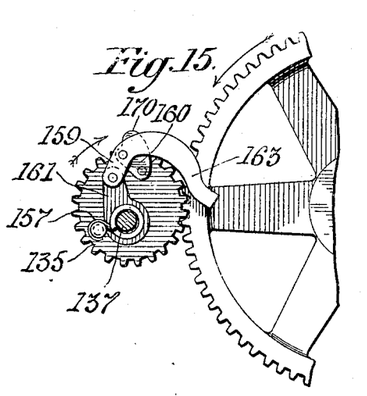
Figure 16:
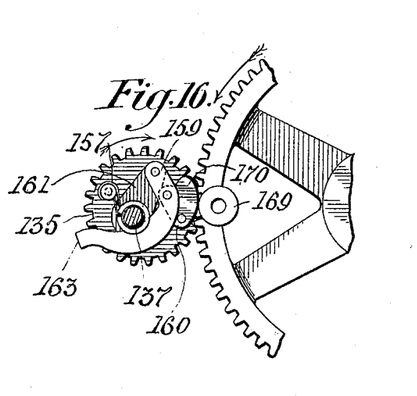

The means whereby the toggle-bars are bent, as above described, consist of the pins 165 and 167, which project from the upper surface of the rim of the gear-wheel 131, and they operate as follows: Fig. 13 shows the pins approaching a straight line running through the centers of the shafts of the wheel and pinion, and the pin 165 is the first one struck by the rotating tailpiece. This collision in the absence of the pin 167 would cause the tailpiece to instantly assume the extreme position shown in Fig. 15 and result in the indenting-ring violently striking the flange of the sealing-cap. It is to avoid this and effect a more gradual initial indenting of the cap-flange that the second pin 167 is employed. This pin catches the tailpiece after the toggle is broken or its bars bent and gradually releases it. To return the toggle to its original position after the cap-sealing operation has been accomplished, the gear-wheel 131 is provided with the roller 169, which collides with a projection 170 on the toggle-bar 160 and forces the said bar inward, as shown in Fig. 16.

The gravity-plunger 125 has been described as a device to hold the sealing-cap on the bottle-head until it reaches a proper elevation and subsequently to cause the compression of the packing-ring during the sealing operation between the crown of the cap and the bottle-lip. By reference to Fig. 10 it will be seen that the stoppage of the plunger in its upward movement is effected by the shoulder, formed by the reduction in diameter of its upper portion, coming in contact with the head 172, and this takes place as the sealing-cap reaches its proper sealing position within the indenting-ring, as shown in Fig. 17. As it is necessary that the gravity-plunger 125 should be lifted slightly, so as not to interfere with the deposit of a bottle-cap on the shutters 77 immediately before the elevation of the bottle, the upper surface of the idle spur gear-wheel 110 is provided with ten inclined projections 173 (see Figs. 7 and 10) and the plunger with a pin which unites it to a lever 175, the free end of which rests on the said wheel and is lifted by a projection before each sealing operation.

Figure 2:
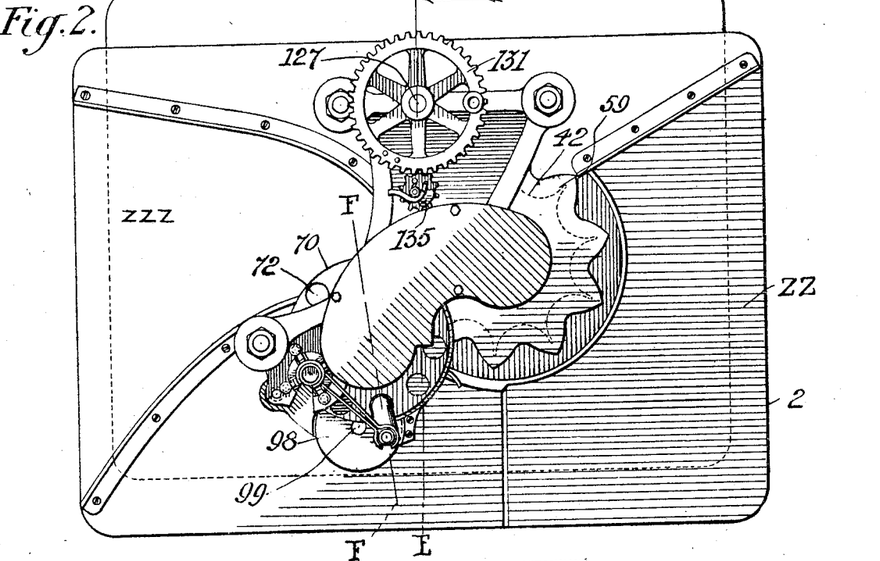
Fig. 2 is a plan of Fig. 1.

By reference to Figs 2, 4, and 8 it will be seen that the portion of the table 2 marked Z Z is on a higher plane than the remaining part, and it is upon this part of the table that the bottles to be sealed are placed, and by reference to Figs. 4 and 5 that the table is provided with a curved plate 180 to force the bottles closely into the pockets in the disk 40. Unsealed bottles are pushed by hand into contact with the intermittingly-rotating pocketed disk 40 and by it are successively carried around to the sealing devices, and each bottle as sealed is discharged by the said disk at the opposite side of the table, from which it is removed.

From the foregoing description of the machine and of the uses of its various elements it will be understood that at each operation of the machine effected during a one-tenth of a rotation of the pocketed disk carrying the bottles a bottle-cap is drawn down from the aggregation of caps in the magazine formed of the open-faced tube 64 into a hole 72 in the annular plate 70, so as to rest on the fixed segmental base-plate 63. A packing-ring or gasket is dropped into the recess 104 in the vibratory disk 98, which packing-ring in the movement of the disk in the direction indicated by the arrow at its circumference is conveyed to beneath another of the holes 72, which in a previous operation of the machine has been provided with a cap and pushed into the cap, and at the same time a gasketed cap has been moved around and over a bottle and directly beneath the sealing devices, into which a bottle is forced. As the upward movement of the bottle continues the gravity-plunger 125 is raised until it resists further movement by its shoulder coming into contact with the head 172, when the gasket is compressed, the joint formed, and the indenting-ring 152 released from its inoperative position, whereby it is made to indent the flange of the sealing-cap, and the indentation thereby produced being extended around the flange the sealing operation is completed. The final step in the sealing operation is performed in, say, three gyrations of the indenting-ring, after which the ring is returned to its inoperative position in the manner before described. Immediately after this the sealed bottle is rapidly lowered by the operation of the cam mechanism before described until it reaches its original height, and as it is still within a pocket in the pocketed disk 40 it is carried around by that device to the portion of the table marked Z Z Z in Figs. 1 and 2, when by contact with the switch-rail 185, Fig. 2, not before referred to, it is forced from the pocket and left on the table, from which it is removed by hand.

I claim as my invention—

1. In a machine for closing in the pendent flange of a bottle-sealing cap, under and in contact with a shoulder formed on a bottle to seal the same, a holder for a capped but unsealed bottle, and a ring having an indenting inner circumference into which the capped head of the bottle is introduced, combined with mechanism to bring the said indenting-surface of the ring into indenting contact with the flange of the sealing-cap, and appliances to gyrate the said indenting-ring whereby the indentation produced as described is made to extend around the flange of the sealing-cap, substantially as specified.

2. In a machine for closing in the pendent flange of a bottle-sealing cap under or in contact with a shoulder formed on a bottle to seal the same, a holder for a capped but unsealed bottle, and a loose ring having an indenting inner circumference into which the capped head of the bottle is introduced, combined with mechanism to bring the indenting-surface of the ring into yielding indenting contact with the flange of the sealing-caps, and appliances to gyrate the said indenting-ring, whereby the indentation produced as described is made to extend around the flange of the sealing-cap, substantially as specified.

3. In a machine for sealing a bottle by the closing in of the flange of a sealing-cap around the head of the bottle, means to elevate the bottle into the sealing-cap, a lever adapted to have a longitudinal sliding movement with respect to its fulcrum, having at one end a loose indenting-ring substantially as described, into which the sealing-cap in the elevation of the bottle is inserted, and at the other end provided with a crank mechanism whereby in the operation of the crank, a circumferential indentation is produced in the flange of the cap, substantially as specified.

4. As means to effect an annular indentation around the flange of a bottle-cap for the purpose described, a lever adapted to have a longitudinal sliding movement with respect to its fulcrum, having at one end an indenting-ring into which the capped head of the bottle is inserted, and at the other end provided with an actuating mechanism which consists substantially of a rotary shaft, a second shaft extending longitudinally through, and situated eccentrically with respect to the first, a crank secured to the end of the eccentrically-placed or inner shaft, the pin of the crank having a stroke which corresponds in length with the eccentricity of the two shafts, combined with means whereby the inner shaft may be partially rotated independently of the outer shaft to bring the center of the crank-pin into alinement with the axis of the outer rotary shaft and thereby make it an inoperative device or one incapable of transmitting motion to the lever; or out of the said alinement when it serves as a motor and in its revolution causes the end of the lever with which it is connected, to describe a circle, and the lever as a whole to have a sliding movement with reference to its fulcrum, substantially as specified.

5. As means to effect an annular indentation around the flange of a bottle-sealing cap for the purpose described, using in the operation a spring-pressure, a lever adapted to have a longitudinal sliding movement with respect to its fulcrum, having at one end a loose indenting-ring into which the capped head of the bottle is inserted, and at the other end provided with an actuating mechanism which consists substantially, of a rotary shaft, a second shaft extending longitudinally through and situated eccentrically with respect to the first, a crank secured to the end of the eccentrically-placed or inner shaft, the pin of the crank having a stroke which corresponds in length with the eccentricity of the two shafts, combined with means whereby the inner shaft may be partially rotated independently of the outer rotary shaft to bring the center of the crank-pin into alinement with the axis of the outer shaft and thereby make it an inoperative device or one incapable of transmitting motion to the lever; or out of the said alinement when it serves as a motor and in its revolution causes the end of the lever with which it is connected, to describe a circle, and the lever as a whole to have a sliding movement with reference to its fulcrum; and a spring connection between the said shafts whereby the crank is yieldingly held in an operative condition, substantially as specified.

6. In a bottle-sealing machine provided with a magazine in which sealing-caps comprising a crown and a pendent flange, are stacked in column with their flanges down, and from which they are separately withdrawn to mechanism whereby they are conveyed to the sealing devices, the combination of the magazine, spring-fingers at the end of the magazine to yieldingly hold the sealing-caps in column, and spring-held fingers situated beneath the column of sealing-caps adapted to be alternately closed and extended, and means to effect a vertical reciprocating movement of the said fingers whereby they are introduced into the lowest cap of the column while in a partially-closed condition and after their distention and the contact of their ends with the inner circumference of the said cap, withdrawn, carrying with them the said cap, substantially as specified.

7. In a machine for closing in the pendent flange of a sealing-cap toward the head of a bottle, in a bottle-sealing operation, a holder for the capped and unsealed bottle, a substantially non-rotating ring having an indenting inner circumference, into which ring the capped head of the bottle is introduced, combined with mechanism to bring the said indenting-ring into indenting contact with the flange of the sealing-cap, and appliances to gyrate the said indenting-ring whereby the indentation produced as described, is made to extend around the flange of the sealing-cap, substantially as specified.

8. In a machine for closing in the pendent flange of a sealing-cap toward the head of a bottle, in a bottle-sealing operation, a holder for the capped and unsealed bottle, a loose substantially non-rotating ring having an indenting inner circumference, into which ring the capped head of the bottle is introduced, combined with mechanism to bring the said indenting-ring into indenting contact with the flange of the sealing-cap, and appliances to gyrate the said indenting-ring whereby the indentation produced as described, is made to extend around the flange of the sealing-cap, substantially as specified.

ALBERT A. WOOD.

Witnesses:
OREGON MILTON DENNIS,
WM. T. HOWARD.